Oct. 17, 1933.　　F. E. GARBUTT ET AL　　1,930,796
HIGH SPEED UNIVERSAL HEAD FOR MILLING MACHINES
Filed May 13, 1931　　3 Sheets-Sheet 1

INVENTORS:
FRANK E. GARBUTT,
HARRY G. CUNNINGHAM,
THOMAS M. INGMAN,
BY

ATTORNEY.

Oct. 17, 1933.　　F. E. GARBUTT ET AL　　1,930,796
HIGH SPEED UNIVERSAL HEAD FOR MILLING MACHINES
Filed May 13, 1931　　3 Sheets-Sheet 2

INVENTORS:
FRANK E. GARBUTT,
HARRY G. CUNNINGHAM,
THOMAS M. INGMAN,
BY

ATTORNEY.

Oct. 17, 1933.  F. E. GARBUTT ET AL  1,930,796
HIGH SPEED UNIVERSAL HEAD FOR MILLING MACHINES
Filed May 13, 1931   3 Sheets-Sheet 3
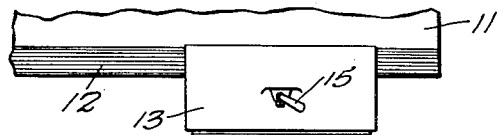
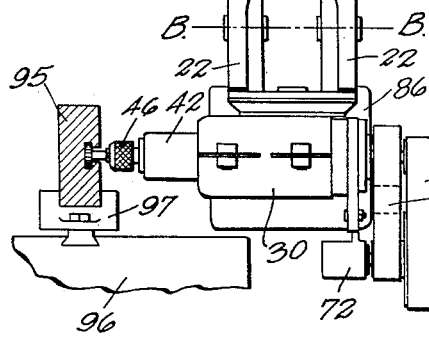
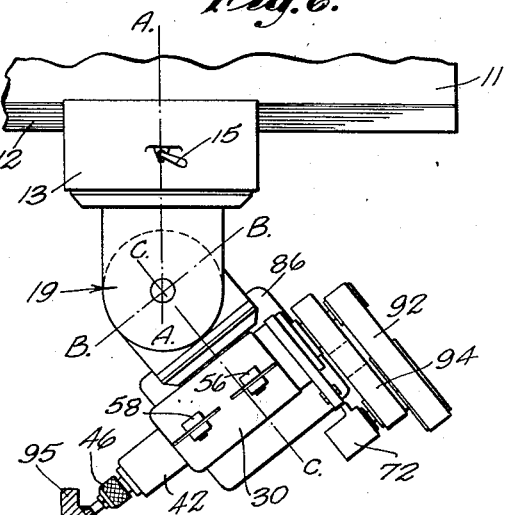
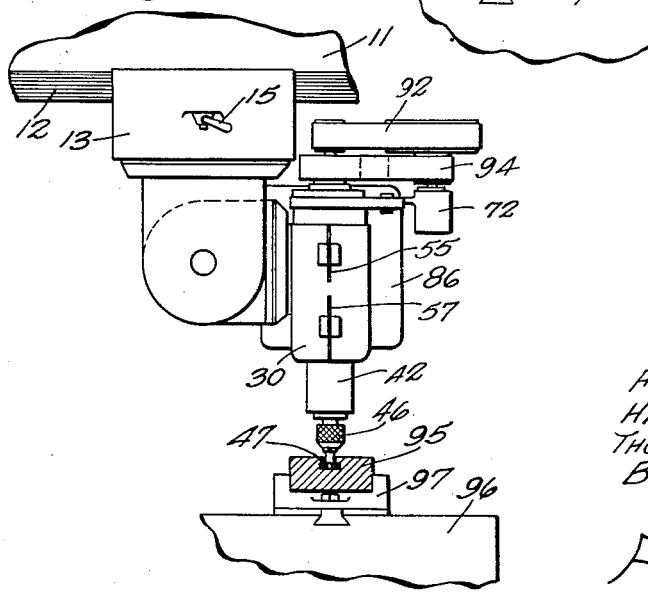
INVENTORS:
FRANK E. GARBUTT,
HARRY G. CUNNINGHAM,
THOMAS M. INGMAN,
BY
ATTORNEY.

Patented Oct. 17, 1933

1,930,796

UNITED STATES PATENT OFFICE 1,930,796

HIGH SPEED UNIVERSAL HEAD FOR MILLING MACHINES

Frank E. Garbutt, Harry G. Cunningham, and Thomas M. Ingman, Los Angeles, Calif.

Application May 13, 1931. Serial No. 536,970

3 Claims. (Cl. 90—17)

Our invention relates to milling machines in general and more particularly to high speed milling attachments adapted for use in combination with milling machines.

It is well known in the art that for some milling operations on such work as die making, etc., it is necessary to use a small cutter which should be run more rapidly than the fastest spindle speed available in standard milling machines, and, in order to obtain these high speeds, special attachments are sometimes used. These attachments, as known in the art at present, consist principally of an auxiliary spindle that holds and drives the cutter and suitable gearing connected to the main spindle of the milling machine. The gearing and spindle are carried by a housing which is attached to the machine.

The so-called universal milling attachment of the present known type is so named because the housing supporting the spindle and gearing is designed to provide a pivoting action in a horizontal plane and a vertical plane so that the spindle may be set at any angle in both the horizontal and vertical planes. It is sometimes difficult, however, on some operations to obtain the desired setting of the spindle relative to the work, because of the fact that the auxiliary spindle is retained in a certain definite relationship with the main spindle of the milling machine. On very small work it is often found to be impossible to adjust the work-table of the machine (to which the work is clamped) in such a position that the desired angle of the spindle relative to the work is obtained without a special vise to hold the work, or without using a specially designed long arbor to hold and rotate the cutter.

We have designed our universal head attachment with the object of adapting it to use in combination with any type of milling machine, die-sinking machine, grinding machine, or the like.

It is another object of our invention to provide a milling machine attachment of the character described which is operated independently of the main spindle of the machine.

Another object of our invention resides in the provision of a milling machine attachment which includes a head member journalling a spindle which in turn carries a milling cutter, and a power means supported by the head member for rotating the spindle independent of the power means for rotating the main spindle of the milling machine.

It is another object of our invention to provide a device of the type described in the above paragraph which includes a coupling member connecting the head member to a supporting member included in the milling machine, this coupling member being operable to pivot in a full universal range so that the spindle may be positioned at any desired angle between horizontal and vertical in any vertical plane.

It is another object of our invention to provide a device as described above in which the coupling member included therein is operable to pivot on three separate axes, all of which intersect at one point.

It is an important feature of our invention that the drive means connecting the power means and the spindle is readily replaceable to change the speed ratio between the power means and the spindle to obtain a desired spindle speed to suit different classes of work.

These and other objects and features will be made evident in the following part of the specification and in the appended claims. This specification might be better understood with reference to the accompanying drawings, in which:

Figs. 5, 6 and 7 are somewhat diagrammatical views showing our device in three different operative positions for the purpose of illustrating the utility of the device for different forms of milling work.

Figure 1:
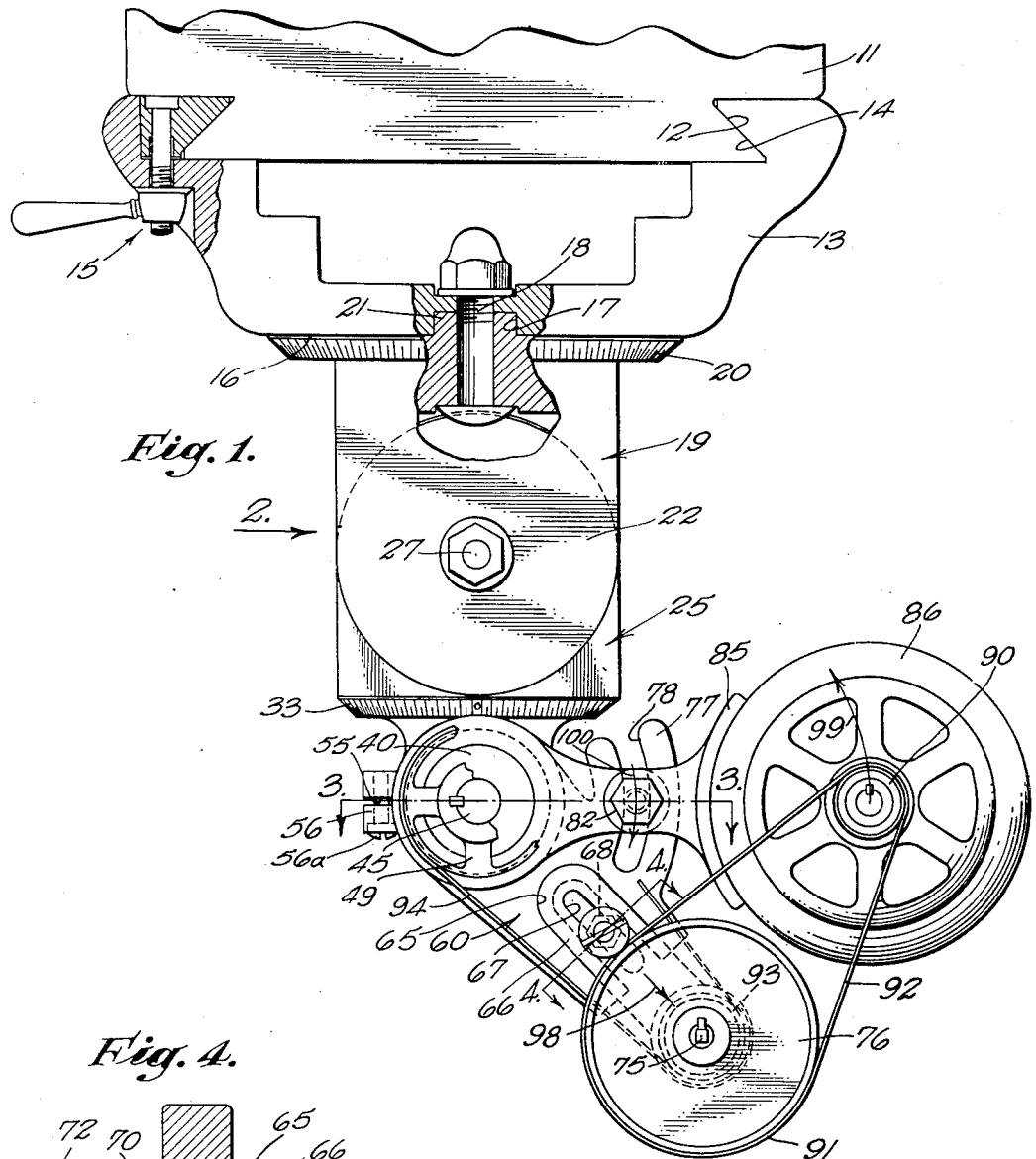
Fig. 1 is an end elevation of our device with parts broken away to show certain details of construction.

Referring to the drawings, we show a stationary supporting member 11, which may be secured to or integral with the overarm of a milling machine of ordinary design, not shown. The supporting member 11 is provided with a dovetailed way 12. Slidably mounted on the way 12 is a depending U-shaped carriage member 13 having a dovetailed groove 14 engaging the way 12. The carriage member 13 includes a clamping means 15 of any suitable type adapted when locked to prevent this carriage member from movement relative to the way 12. The carriage member 13 includes a lower wall providing a flat surface 16 in which is formed an upwardly extending recess 17. Pivotally secured to the carriage member 13, as by a bolt 18 in the manner shown, is a primary yoke member 19. The primary yoke member 19 comprises a bearing plate 20 engaging the flat surface 16, a bearing pin 21 extending upwardly into and conforming with the recess 17, and a pair of relatively spaced, parallel, depending legs 22. Pivotally secured to the primary yoke member 19 is a secondary yoke member 25 comprising a pair of relatively spaced, upwardly extending, parallel legs 26 pivoted to the legs 22 as by bolts 27 in the manner shown, and a lower connecting bearing plate 28 which is perpendicular to the legs 26, this plate having a central opening 29 therein.

The primary and secondary yoke members 19 and 25 cooperate to form a coupling connecting the supporting member 11 to a spindle head member generally designated by the numeral 30. The head member 30 comprises an elongated cylindrical body portion 31 providing an axial bore 32, and an integral bearing plate 33, the central axis of which is perpendicular to the axis of the bore 32. The bearing plate 33 is provided with a central bearing pin 34, adapted to be received by the opening 29 in the plate 28. The pin 34 is retained relative to the opening 29, so that the bearing plates 28 and 33 are held in sliding contact by bolt means 35 in the manner shown, although it should be clear that numerous other methods might be used to provide a pivoting action between the secondary yoke member 25 and the head member 30, as well as between primary and secondary yoke members 19 and 25, and between the primary yoke member 19 and the carriage member 13.

Positioned in the bore 32 is an elongated bearing carrier 40 which projects outwardly at each end of the head member 30 and which provides an axal bore 41, recessed at the forward end thereof to receive a forward bearing member 42 and recessed at the rearward end thereof to receive a rearward bearing member 43. These bearing members 42 and 43 and their included thrust-taking means are adapted to journal a spindle 45 which projects outwardly at each end of the bearing carrier 40. The forward end of the spindle 45 is adapted for connection with an arbor 46 adapted to carry a milling cutter or other rotary tool 47. Keyed on the rearward end of the spindle 45 adjacent the bearing 43, and spaced from the rearward end of the bushing 40 thereby, is a pulley 49.

Figure 3:
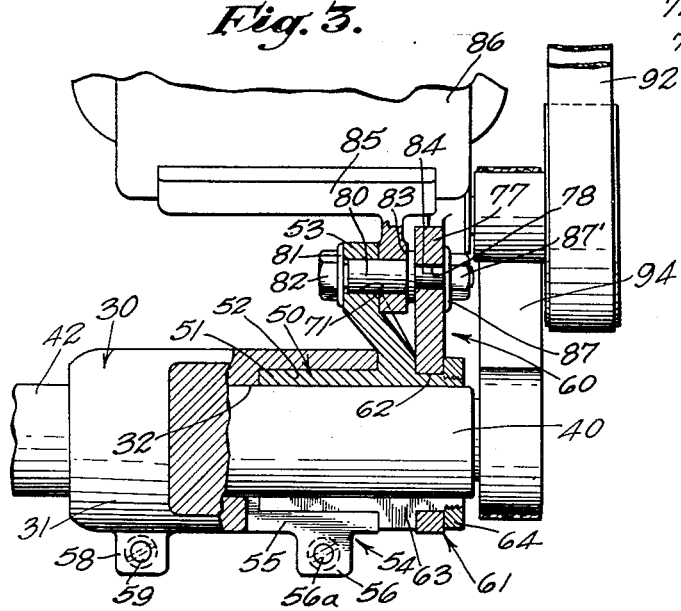
Fig. 3 is a partly sectional plan view of our device, the sectional part of this view being taken as indicated by the line 3—3 of Fig. 1.

Pivotally supported on the rearward portion of the bearing carrier 40, as best shown in Fig. 3, is a motor support bushing 50 comprising a split cylindrical sleeve 51, surrounding the bearing carrier 40, and a laterally extending arm 53. A portion of the bushing 50 extends into a recess 52 provided for the purpose by enlarging the rearward end of the bore 32. Locking means generally designated by the numeral 54 for retaining the lateral arm 53 at any desired angle relative to the head 30 is provided, preferably by kerfing the rearward end of the head 30 to form a slot 55 which extends the full length of the recess 52, and by providing lug members 56 on each side thereof through which a screw or bolt means 56a may extend for the purpose of shrinking the rearward portion of the body 31 and the split sleeve portion 51 of the bushing 50 to obtain a non-slipping relationship between the bearing carrier 40, the bushing 50, and the head 30. Likewise, the forward end of the body 31 of the head member 30 is preferably kerfed to form a slot 57 extending rearwardly to a point just short of the forward end of the slot 55, this slot 57 being also provided with a lug member 58 on each side thereof through which a bolt 59 extends for the purpose of shrinking the forward end of the body 31 around the bearing carrier 40 in non-slipping relationship.

Figure 4:
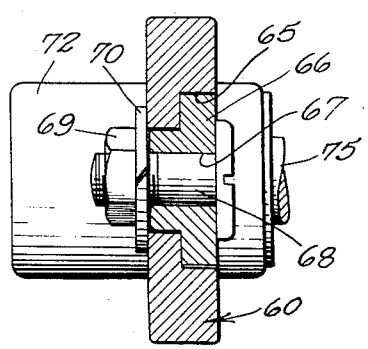
Fig. 4 is a fragmentary sectional view taken as indicated by the line 4—4 of Fig. 1.
Figure 2:
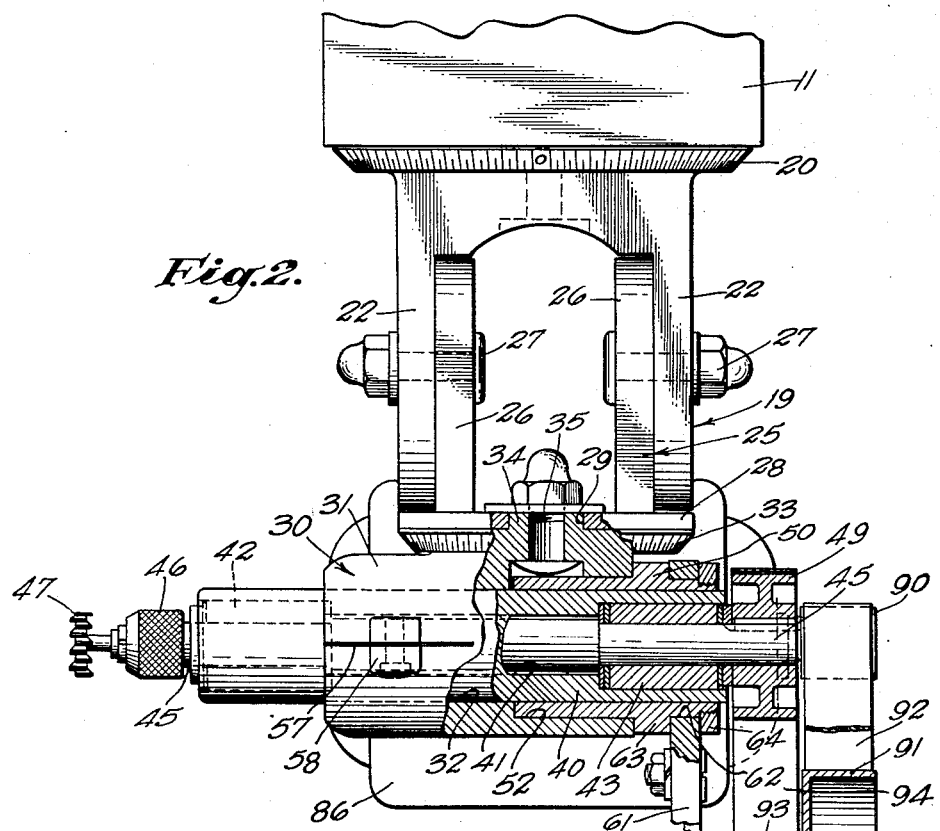
Fig. 2 is a side elevation taken as indicated by the arrow 2 of Fig. 1, this view having a portion broken away to a median plane to show certain features.

Pivotally supported on the rearward end of the bushing 50 is a pulley bracket generally designated by the numeral 60. The bracket 60 includes a body portion 61 having a circular opening 62 therein, which opening is adapted to receive the rearward end of the bushing 50. The bracket 60 is prevented from longitudinal movement on the bushing 50 by being confined between a shoulder 63 formed on the bushing 50 and a nut 64 threadedly engaging the extreme rearward end of the bushing, as shown in Figs. 2 and 3. Formed in the outer end of the bracket 60 is an inwardly extending step-cut slot 65, the axis of which is perpendicular to the longitudinal axis of the head member 30. This slot 65 is adapted to slidably receive a pulley carrier 66 which conforms to the configuration of the slot 65, as shown best in Figs. 1 and 4. The pulley carrier 66 is provided with an elongated slot 67, through which a bolt 68 extends in the manner shown best in Fig. 4. This bolt 68, with the cooperation of a nut 69 and a washer 70, is adapted to rigidly clamp the pulley carrier 66 against slidable movement in the slot 65. As best shown in Fig. 2, the outer end of the pulley carrier 66 is provided with an enlargement 72 providing a recess 73 adapted to receive a pair of bearing members 74. The bearing members 74 are adapted to journal a stub shaft 75 in the manner shown, the shaft 75 extending outwardly from the recess and the axis of rotation thereof being parallel to the axis of the spindle 45. Keyed to the outer end of the stub shaft 75 is a double idler pulley 76, provided for a purpose to be described later. As best shown in Fig. 1, the pulley bracket 60 is provided with an upwardly extending fork 77 providing a downwardly extending arcuated slot 78, this slot being described on a radius from a point in the longitudinal axis of the spindle 45. The longitudinal axis of this slot 78 intersects at right angles the longitudinal axis of the opening 71 provided in the laterally extending arm 53 of the bushing 50.

Extending rearwardly through the opening 71 in the arm 53 is a tie-bolt 80 providing a threaded end portion, adapted to receive a washer 81 which abuts the forward face of the arm 53, and a nut 82. The tie-bolt 80 is provided with an increased diameter portion forming a shoulder 83. Pivotally mounted on the tie-bolt 80 and confined between the shoulder 83 and the rearward face of the arm 53 is a motor supporting bracket 85 to which is secured a motor 86, the axis of which is parallel to the axis of rotation of the spindle 45. Extending rearwardly from the shoulder 83 of the tie-bolt 80 is an integral, reduced diameter pin 84 which is adapted for reception into the slot 78 of the fork 77. The extreme rearward end of the pin 84 is threaded to receive a clamp washer 87 and a nut 87'. The nuts 82 and 87' cooperate with the shoulder 83 to clamp the arm 53, the motor bracket 85, and the pulley bracket 60 against relative movement, and serve normally to retain these parts in the positions shown in Fig. 1.

The drive shaft of the motor 86 is provided with a pulley 90 which is aligned with the rearward rim 91 of the pulley 76 mounted on the stub shaft 75, the motor pulley 90 being operable to drive the pulley 76 by a belt 92 which connects these two pulleys. Extending around the peripheries of the forward rim 93 of the pulley 76 and the spindle pulley 49 is a belt 94 serving to rotate the spindle 45 and the milling cutter 47.

The operation of our invention is as follows, with particular reference to Figs. 5, 6 and 7.

In Fig. 5, we show the parts of our device in the same relative positions as shown in Figs. 1 and 2. At this time the cutter is illustrated as being utilized to cut a T-slot in an element 95 which is clamped upon the movable work-table 96 of the milling machine by a suitable vise 97. Milling operations are well known in the art, and for this reason no discussion of the actual milling operation will be herein given. If it is desired to mill an element in the manner indicated in Fig. 6, the coupling of the invention is manipulated in the following manner. The primary yoke member 19 may be rotated relative to the carriage member 13 through 90° on its axis A—A, which will be hereinafter termed the primary axis; the head member 30 may be rotated relative to the secondary yoke member through 90° on its axis C—C, which will hereinafter be called the tertiary axis; and the secondary yoke member may be swung on its axis B—B, which will be hereinafter called the secondary axis, until the spindle lies in a plane at the desired angle relative to the work-table 96 and the cutter 47 contacts the element 95, as shown. If it is desired to use our device as a vertical miller, the secondary yoke member may be rotated on its axis B—B from the position shown in Fig. 6 to the position shown in Fig. 7, so that the cutter 47 engages the element 95, as shown. It will be clear that the head member 30 may be adjusted so that the axis of rotation of the spindle may be positioned at any desired angle between horizontal and vertical in any vertical plane extending radially from the axis A—A. As shown in Figs. 1 and 2, the bearing plate 20 of the yoke member 19 and the bearing plate 33 of the head member 30 are graduated in degrees to facilitate the setting of the relative parts comprising the coupling member of the invention.

It should be apparent that our invention should not be limited to details of construction, such as the drive means including the pulleys 49, 76 and 90 and the belts 92 and 94, inasmuch as a drive means utilizing chain means or a drive means comprising a gear train between the motor shaft and the spindle would clearly come within the scope of our invention.

It is a feature of the drive means shown, however, that the belts 92 and 94 may be tightened as desired, with the spindle 45 in any position. This is accomplished either by loosening the nuts 69 and sliding the pulley carrier 66 downwardly in the direction of the arrow 98 of Fig. 1 to tighten the belts 92 and 94, or by loosening the nut 82 and pivoting the motor 86 upwardly on the tie-bolt 80 in the direction of the arrow 99 of Fig. 1, to tighten the belt 92.

Should it become necessary, while endeavoring to set the spindle at a particular angle, to provide additional clearance between the motor and the coupling or the carriage member 13, the bolt or screw 56a may be loosened permitting the bushing to rotate relative to the head 30 and the bearing carrier 40, and the nuts 82 and 87' may be loosened to permit the tie-bolt 80 to be moved downwardly in the slot 78 in the direction of the arrow 100 the necessary distance. The nut 69 may then be loosened and the pulley carrier moved downwardly until the belts 92 and 94 are tightened.

In the event that a change in speed of the milling cutter is desired, it is clear that one or more of the pulleys 49, 76 and 90 may be readily replaced by pulleys of different diameters, thus changing the speed ratio between the motor shaft and the spindle 45.

Although we have herein shown and described only one complete embodiment of our invention, it should be understood that we are aware of various changes that might be made therein and numerous embodiments thereof that might be devised without departing from the spirit and scope of our invention.

We claim as our invention:

1. A machine having a movable work-table adapted to carry an element to be machined, in combination with a device of the character described, said device including: a head member; a spindle journalled in said head member; a rotary tool mounted on said spindle; means for rotating said spindle; a stationary supporting member adjacent said movable work-table; and a coupling means between said head member and said supporting member adapted to support said rotating tool in contact with said element as said element moves with said work-table, said coupling means including a carriage member adjustably mounted on said supporting member, a primary yoke member pivoted to said carriage member on a primary axis, a secondary yoke member pivoted to said primary yoke member on a secondary axis perpendicular to said primary axis, said secondary yoke member being pivoted to said head member on a tertiary axis perpendicular to said secondary axis, all of said axes intersecting at one point, so that said head member and said spindle may be positioned with the axis of rotation of said spindle at any desired angle between horizontal and vertical in any vertical plane.

2. A machine having a movable work-table adapted to carry an element to be machined, in combination with a device of the character described, said device including: a head member; a spindle journalled in said head member; a rotary tool mounted on said spindle; a motor supporting arm pivoted to said head member; a motor pivotally secured to said arm; a bracket member pivotally secured to said head member; a pulley mounted on the drive shaft of said motor; a shaft rotatably carried by said bracket; pulley means secured to said shaft; a pulley secured to said spindle; belt means cooperating with said pulley on said motor shaft, said pulley means on said bracket shaft and said pulley on said spindle to rotate said spindle with said motor; clamp means for preventing pivoting action of said arm relative to said head member; locking means for normally preventing relative movement between said arm, said motor and said bracket member, said locking means being releasable to allow relative movement between these members to occur for purposes of adjusting the relative positions thereof; a stationary supporting member adjacent said movable work-table; and a coupling means between said head member and said supporting member adapted to support said rotating tool in contact with said element as said element moves with said work-table, said coupling means including a carriage member adjustably mounted on said supporting member, a primary yoke member pivoted to said carriage member on a primary axis, a secondary yoke member pivoted to said primary yoke member on a secondary axis perpendicular to said primary axis, said secondary yoke member being pivoted to said head member on a tertiary axis perpendicular to said secondary axis, all of said axes intersecting at one point, so that said head member and said spindle may be positioned with the axis of rotation of said spindle at any desired angle between horizontal and vertical in any vertical plane.

3. A machine having a movable work-table adapted to carry an element to be machined, in combination with a device of the character described, said device including: a head member; a spindle journalled in said head member; a rotary tool mounted on said spindle; means for rotating said spindle; a stationary supporting member adjacent said movable work-table; and a coupling means between said head member and said supporting member adapted to support said rotating tool in contact with said element as said element moves with said work-table, said coupling means including a carriage member adjustably mounted on said supporting member, a primary member pivoted to said carriage member on a primary axis, a secondary member pivoted to said primary member on a secondary axis perpendicular to said primary axis, said secondary member being pivoted to said head member on a tertiary axis perpendicular to said secondary axis, all of said axes intersecting at one point, so that said head member and said spindle may be positioned with the axis of rotation of said spindle at any desired angle between horizontal and vertical in any vertical plane.

FRANK E. GARBUTT.
HARRY G. CUNNINGHAM.
THOMAS M. INGMAN,